Jan. 22, 1929.
E. H. GREIBACH
1,699,788
ELECTRICAL MEASURING INSTRUMENT
Filed Oct. 20, 1927
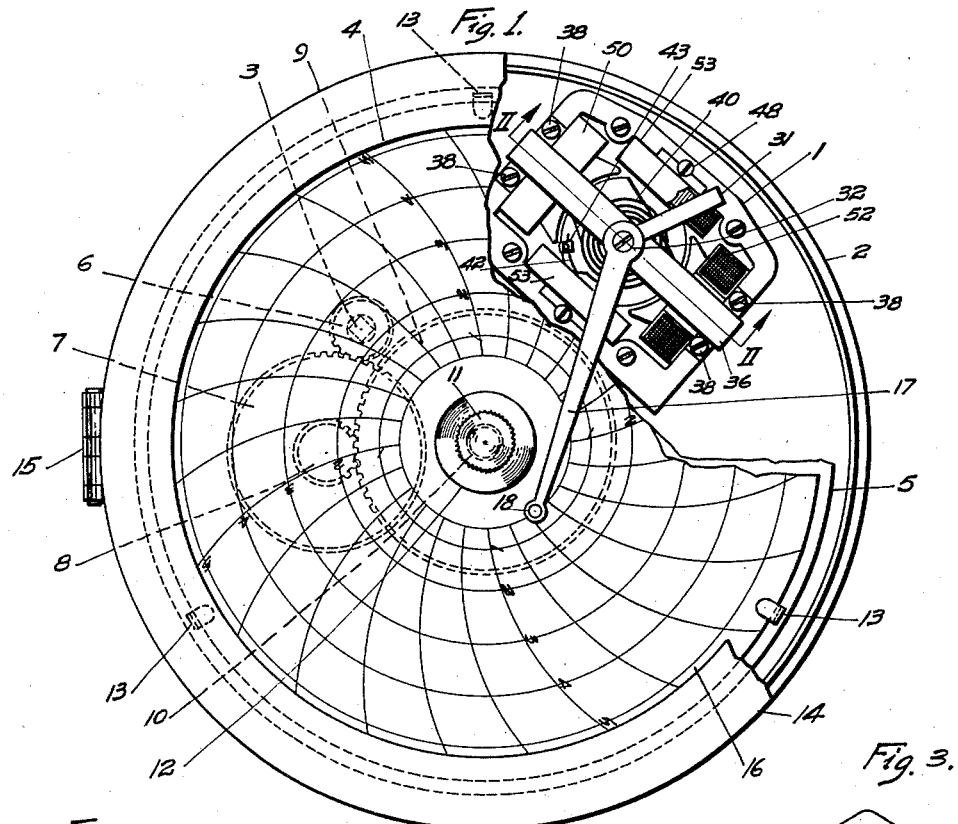
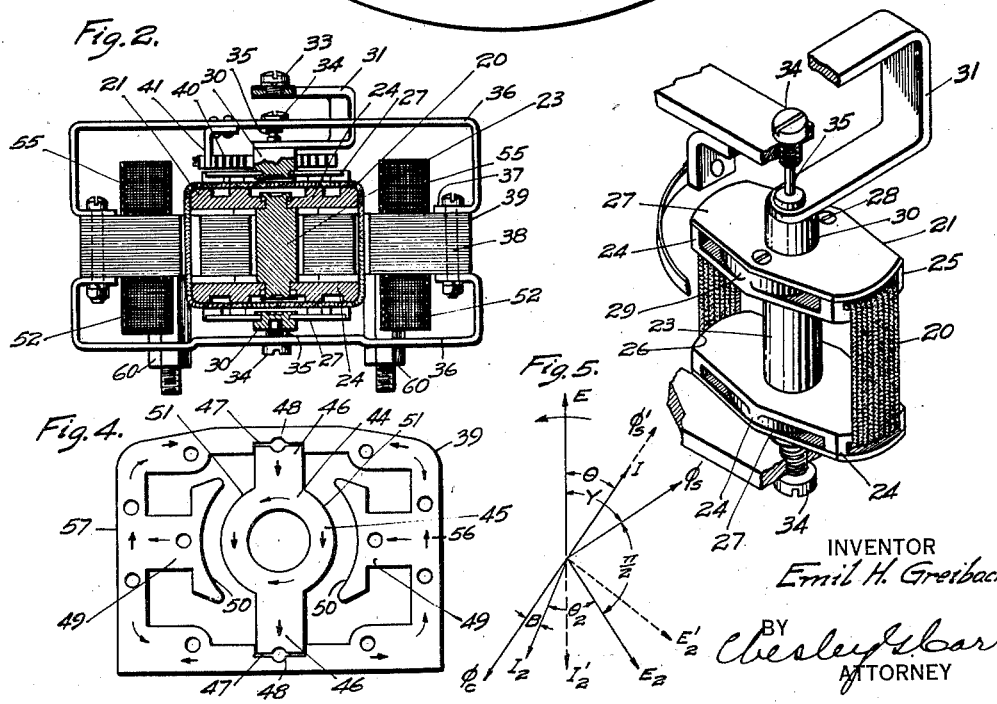
INVENTOR
Emil H. Greibach.
BY
Chesley J. Barr
ATTORNEY Patented Jan. 22, 1929.

1,699,788

UNITED STATES PATENT OFFICE.

EMIL H. GREIBACH, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed October 20, 1927. Serial No. 227,439.

My invention relates to a method of and apparatus for controlling movement of a deflecting coil, such as one included in an electrical measuring instrument, and more particularly a meter for recording the product of a plurality of electrical quantities.

My invention resides in apparatus for actuating a stylus or pen directly from a movable system in accordance with a characteristic of an electrical circuit, such as watts, and it is characteristic of my apparatus for this purpose that it has an extremely high torque.

It is further characteristic of my invention that it is relatively small and includes desirable engineering features of design, such as freedom of conducting springs; relatively small magnitudes of current and voltage in the movable system; all electrical circuits comprising unbroken conductors; and other features that are set forth or deducible from the following description.

In practicing my invention, I inductively energize a closed-circuited coil in accordance with one of the quantities, such as volts, and rotatably dispose such coil in a magnetic field maintained proportional to another quantity, such as current. The current induced in the coil reacts with such magnetic field and tends to turn the coil out of the magnetic field. A spring balances the torque exerted on the coil and the latter is directly secured to a stylus that marks a moving record-receiving surface in accordance with watts.

For a more thorough understanding of my invention, reference is to be had to the accompanying drawings taken in connection with the following description.

In the drawings

Figure 1 is a view in front elevation of apparatus constructed in accordance with my invention;

Figure 2 is a view in cross section taken on the line II—II of the instrument shown in Fig. 1;

Fig. 3 is an elementary perspective view of the movable coil shown in Figs. 1 and 2;

Fig. 4 is a plan view of the laminated core structure shown in Figs. 1 and 2; and Fig. 5 is a vector diagram showing the operation of the meter.

A high torque watt meter 1 constructed in accordance with my invention, preferably is mounted within a casing 2 of substantially cylindrical shape in which a clock or other constant speed device 3 is also mounted to drive a suitably calibrated record-receiving surface or member 4 over the face of a smooth-surfaced plate 5. The member 4 is preferably of paper in the form of a circular disc and is rotated or moved at a constant predetermined speed by the clock 3 through suitable speed-reducing gears 6, 7, 8 and 9. The last named gear wheel 9 drives a spindle 10 to which the paper disc 4 is secured in any suitable manner, as, for example, by a removable thumb piece 11 that extends through an opening 12 in the central portion of the plate 5. The member 4, preferably, is guided in its plane of rotation by overhanging members 13 that preferably are press punched out of the face of the plate 5. A front cover 14 is hinged at 15 to the casing 2 and is provided with a window 16 that is secured suitably to the outer rim of the cover 14.

The clock 3 preferably drives the member 4 at such rate of speed that the latter makes one complete revolution in a predetermined desired period, such as every 24 hours. In such case it only becomes necessary to replace the member 4 once a day and this is easily done by unscrewing the thumb piece 11.

The member 4 is marked by a stylus 17 having a pencil lead 18 secured to its outer extremity. A relatively high torque is necessary to overcome the friction of the movement of the pencil 18 on the face of the member 4, and it is, therefore, one of the objects of my invention to provide sufficient torque in the movement of the instrument 1 to overcome such friction. Torques of the ordinary measuring instruments heretofore known have not been sufficient to overcome such friction, but external driving means such as control motors driving a worm screw have been necessary to move the marker or pen over the face of the moving record-receiving surface.

By providing an instrument 1 having a relatively high torque, I obviate such translating apparatus and other undesirable characteristics by driving the stylus 17 directly by the movement of the measuring instrument, a result long sought for by those skilled in the art. It has been well known that if an arcuate measuring instrument having a relatively high torque, were available the stylus of the recording instrument could be driven directly by the movement of the instrument. Therefore, my invention lies particularly in a measuring instrument that is accurate and in addition develops a relatively high torque.

The important and novel feature of the present invention is embodied in the measuring instrument 1 that is adapted, for example, to measure the product of a plurality of quantities of an electrical circuit, such as watts or volt amperes.

Referring now particularly to the measuring instrument 1, a closed-circuited coil 20 is wound, preferably, on a bobbin 21 that comprises a central supporting member 23 having plates 24 secured to the ends thereof in any suitable manner, as for example, by spinning over the ends of member 23 into suitably shaped openings in the plates 24, Fig. 2. The plates 24 are provided with laterally projecting corners 25 that are adapted to retain the coil 20 in proper position. The sides of the coil 20 are made substantially arcual by the arc-shaped ends 26 of the plates 24. The plates 24 are each provided with a cover 27 that embraces the corners 25 and is secured thereto in any suitable manner, as, for example, by screws 28 and spacing members 29. Members 30 are mounted on the upper and lower covers 27 substantially in alinement with the central supporting member 23. A substantially U-shaped member 31 is secured to the upper member 30 and is adapted to translate the motion of the bobbin 21 to the stylus 17 to which it is radially secured at 32 preferably by a screw 33. The member 31 permits the member 4 to rotate over the face of the plate 5 without interference from the actuating mechanism that is mounted therebeneath. The bobbin 21 is journalled between bearing screws 34 which coact, respectively, with pins 35 projecting from the members 30. The bearing screws 34 are supported in position preferably by members 36 of substantially U-shape having inwardly projecting portions 37 that are secured in position by bolts 38 extending through a laminated core 39. The supports 60 are secured to the bottom of the casing and retain the instrument in fixed position.

Turning motion of the bobbin 21 may be restrained in any suitable manner, as, for example, by a coil spring 40 that is secured at one end to the upper member 30 and at the other end to a member 41 of substantially L-shape that is riveted, preferably, to the upper projecting member 36. The end 42 of the spring 40 is preferably adjustably secured to the member 41 by a screw clamp 43 so that the length of the spring 40 may be varied to change the full scale of the meter.

The coil 20 is provided with a stationary laminated core 44 that has a substantially annular central portion 45 that conforms with the inner space between the sides of the coil 20 and the central supporting member 23 and permits a turning motion of the bobbin 21 within the limits of the extensions 46 of the core 44.

The laminated core 44 is secured to the laminated core 39 in any suitable manner, as, for example, by slots 47 and bolts 48 that cooperatively engage the extensions 46 of the core 44 and sides 48 of the electromagnet 39.

The electromagnet 39 is provided with inwardly extending projections 49 whose inner faces 50 conform substantially with the outer faces 51 of the ring 45. The spaces between the faces 50 and 51 are adapted to receive the sides of the coil 20. The laminated electromagnet 39 is preferably the shape of a hollow rectangle because such form permits flux traversing the core member 44 to have a complete magnetic path of high permeability in the area outside of the coil 20; in a similar manner the fluxes traversing the projections 49 are also provided with a magnetic path of relatively high permeability. Coils 52 are disposed around the respective projections 49 of the electromagnet 39 and coils 53 are disposed around the respective end portions 46 of the core 44. Such coils may be disposed around the sections of the core in any suitable manner, but I prefer to manually wind the coils 52 in insulated forms 55 that are mounted on the projections 49. On the other hand, the coils disposed around the projection 46 of the core member 44 are preferably form-wound in a machine, due to the fact that they are for the voltage flux and, therefore, comprise a relatively great number of turns of small wire. In the process of manufacture the laminæ of the core member 44 are stacked together and the coils 53 that have been wound by a machine to the proper shape and size are placed over the projections 46. The core 44 is then placed in position with respect to the core 39 and the two are secured together in the manner hereinbefore set forth by bolts 48.

The coils 53 are preferably connected in series and comprise the voltage coils of the device as set forth above. The coils 52 preferably comprise a relatively small number of turns of heavy wire and are connected in series to form the current coils of the device. When the device is to be used as a watt meter the coils 52 are connected in series circuit relation with the electric circuit whose power transfer is being measured or with current transformers in the well known manner and the voltage coils 53 are connected in parallel with such circuit. With such connection the voltage coils 53 induce an alternating flux in the core 44. This alternating flux generates a voltage in the winding 20 which in turn causes a current to flow therein that is substantially proportional to the voltage across the voltage coils 53. At the same time the current coils produce a flux between the faces 50 and 51 of the ring 45 and the projections 49 respectively, that is substantially proportional to the current traversing the circuit. Such current reacts with the current traversing the conductor of the coil 20 and tends to turn the latter out of its field in a well known manner. The torque produced by the reaction of the current in the coil 20 and the flux of the coils 52 produces a torque that is proportional to the product of the voltage times the current times the cosine of the angle between them. This product is equal to the watts traversing the circuit. The torque caused by the reaction of such current and flux is balanced by the spring 40 which causes the stylus 17 to take a position that is indicative of the magnitude of said power.

Of great importance is the novel manner in which the fluxes traversing the core 44 and the projections 49 are caused to traverse their proper paths. Thus, at any instant of time, as indicated by the arrows in the core shown in Fig. 4, the voltage flux traverses a path through the core 44 and divides into two paths, one of which traverses the side 56 and the other of which traverses the side 57 in substantially equal amounts. Substantially no flux traversing the core 44 traverses the projections 49 because of the novel arrangement of said projections with respect to the core 44, since any flux emanating from the coil 53 disposed around the lower projection 46 which tends to take a path around a lower corner of the projection 56 through the projection 49, is balanced by a flux from coil 53 disposed on the upper projection 46 which tends to traverse the upper corner of the portion 56 in an opposite direction through the projection 49 by virtue of the fact that the upper and lower coils 53 have an equal number of ampere turns and the upper path through the portion 56 and the projection 49 and the path through the lower portion 56 and the projection 49 are symmetrical. In a similar manner the upper and lower portions of the section 57 obviate fluxes emanating from the coils 53 tending to traverse the left hand projection 49. Both projections 49 are, therefore, substantially entirely free of fluxes emanating from the voltage coils 53; the latter fluxes taking a path through the core 44 and around the outer periphery of the core 39. In a similar manner, the flux emanating from the current coils 52 is caused to take a path between the faces 50 of the projections 49 and around the outer periphery of the core 39.

Referring to Fig. 5 of the drawings a vector diagram is shown illustrating the operation of the meter. "E" represents the line voltage that is impressed across the voltage coils 53. "I" represents the current traversing the circuit that is impressed across the terminals of the current coils 52. The magnitude and direction of the current I and voltage E are selected as shown in the drawings for convenience. The current I lags the voltage E by an angle $\theta$, or $\theta$ represents the phase angle between the current and voltage of the circuit. The alternating current impressed across the voltage coils 53 causes a flux $\phi_s$ to traverse the core 44. Such flux $\phi_s$ generates a voltage $E_2$ in the coil 20 that is 90° out of phase with the flux $\phi_s$. Such angle is fixed by the constants of the circuit and therefore will remain unchanged. The flux $\phi_s$ lags the voltage E by an angle Y depending upon the resistance and reactance of the coils 53.

The voltage $E_2$ generated in the circuit of coil 20 causes a current $I_2$ to flow through such circuit at a phase angle $\theta_2$ whose magnitude depends upon the resistance and reactance of the coil 20. The current I traversing the coils 52 sets up a flux $\phi_c$ that cuts the sides of the coil 20. Such flux reacts with the currents $I_2$ traversing the sides of the coil 20 and produces a torque proportional to the scalar product of the series flux $\phi_c$ and the current $I_2$.

Stated as an equation—
The torque, $T = KI_2 \times \phi_c \times \cos \beta$.
Where $\beta$ is the phase angle between $\phi_c$ and $I_2$.
K = a constant
In order that this torque shall be proportional to watts, or
$T = K_1 EI \cos \theta$.
Angle $\beta$ must equal angle $\theta$ so that
$T = KI_2 \phi_c \cos \beta = K_1 EI \cos \theta$,
When $I_2 = C_1 E$, $\phi_c = C_2 I$
Where $C_1$, $C_2$ and $K_1$ are proportionality coefficients.

The important requirements of $\beta = \phi$ may be fulfilled by introducing resistance in series circuit relation with the shunt or voltage coils 53. The angle Y is thus varied by varying the amount of resistance in the series circuit until $\theta$ and $\beta$ are made equal.

The angle $\pi/2$ between $\phi_s$ and $E_2$ is fixed as indicated above, and the angle $\theta_2$ between $E_2$ and $I_2$ is also fixed as indicated above by the constants of the closed circuited coil 20. Therefore, when the angle Y is reduced the angle $\beta$ is increased and when $I_2'$ coincides with the direction of E the angle $\beta$ is equal to angle $\theta$.

In accordance with the above indicated proof the instrument therefore actuates the stylus 17 substantially in accordance with the power traversing the electrical circuit.

In addition to being small and compact and having a relatively high torque an instrument constructed in accordance with my invention is free from conducting springs which are subject to the disadvantages of becoming hot and causing an instrument to register inaccurately and is also free of insulating troubles caused by slipping contacts and the like. The current and voltage coils of an instrument constructed in accordance with my invention may be connected directly to the circuit whose power is to be measured, and no slip rings or conducting springs and their attendant disadvantages are necessary.

Various changes and modifications may be made in my invention without departing from the spirit and scope thereof as set forth in the appended claims.

I claim as my invention:

1. A movable element for a meter comprising a central supporting member, plates mounted on the extremities of said supporting member, a coil embracing said plates, covers mounted on said plates, members substantially in alinement with said supporting member secured to said covers, and bearing members mounted on said last named members.

2. In combination, a magnetizable core comprising a closed outer flux path, a closed flux path of laminated magnetizable material joining opposite portions of said outer path, and inwardly extending projections separated from said last named path by air gaps, a turnable coil disposed around said last named path, and means for energizing said flux paths comprising an electromagnetic coil disposed around one of said extensions and an electromagnetic coil disposed around said last named path.

3. A movable element for a wattmeter comprising a central supporting member, plates mounted on the extremities of said supporting member, said plates having substantially arcual ends, an inductively energized coil mounted on said plates, and means for retaining said coil in fixed position with respect to said plates.

4. A magnetizable core comprising a plurality of laminated sheets substantially in the form of a hollow rectangle having inwardly projecting portions the faces of which are substantially arcual, and a magnetizable member joining the sides of said rectangle, said member comprising cylindrical portions the outer periphery of which is spaced from the arcual faces of said projecting portions.

5. A wattmeter comprising a laminated core substantially in the form of a hollow rectangle having a member connecting two opposite sides thereof and having inwardly extending projections from the other two opposite sides, said connecting member having an opening therein, said projections and said connecting member shaped to provide arcual spaces between them, a closed-circuited coil disposed to turn in said spaces, means including a shaft extending through the opening in said connecting member for supporting said coil, means including members mounted on said core for retaining said coil in position with respect to said core, means including a coil mounted on said connecting member for energizing said coil, and means including a coil mounted on one of said projections for producing a magnetic field in proximity to said coil.

6. A wattmeter comprising a laminated core substantially in the form of a hollow rectangle having a member connecting two opposite sides thereof and having inwardly extending projections from the other two opposite sides, said connecting member having an opening therein, said projections and said connecting member shaped to provide arcual spaces between them, a closed-circuited coil disposed to turn in said spaces, means including a shaft extending through the opening in said connecting member for supporting said coil, means including members mounted on said core for retaining said coil in position with respect to said core, means including a coil mounted on said connecting member for energizing said coil, and means including a coil mounted on one of said projections for producing a magnetic field in proximity to said coil, said coils being energized, respectively, in accordance with the voltage and current of a circuit.

7. A wattmeter comprising a movable inductively energized coil having an indicating member mounted thereon and a single laminated magnetizable structure for actuating said coil by the co-action of magnetic fluxes proportional, respectively, to the voltage and current traversing a circuit, said structure comprising magnetic paths of low reluctance, as compared with air coupling said coil, said paths being disposed in the same plane substantially at right angles to each other, one of said paths being provided for the voltage flux and the other of said paths being provided for the current flux.

8. A wattmeter comprising a movable inductively energized coil forming the secondary of a transformer, a laminated core structure for said secondary having a path of low reluctance as compared with air coupling said coil, means for creating a flux in said path proportional to the current in a circuit, and a second path of low reluctance, as compared with air in the same plane but at right angles to said other path, and means for creating a flux in said second path proportional to the voltage in said circuit.

In testimony whereof, I have hereunto subscribed my name this 5th day of October 1927.

EMIL H. GREIBACH.